United States Patent
Radhakrishnan et al.

(10) Patent No.: US 7,599,367 B2
(45) Date of Patent: Oct. 6, 2009

(54) CONSTRAINING FLOODING OF MULTICAST TRAFFIC IN LAYER2 NETWORKS

(75) Inventors: Chandramouli Radhakrishnan, Santa Clara, CA (US); Gaetano Borgione, San Jose, CA (US); Karthikeyan Gurusamy, Santa Clara, CA (US)

(73) Assignee: Cisco Technology, Inc., San Jose, CA (US)

( * ) Notice: Subject to any disclaimer, the term of this patent is extended or adjusted under 35 U.S.C. 154(b) by 576 days.

(21) Appl. No.: 11/257,696

(22) Filed: Oct. 25, 2005

(65) Prior Publication Data

US 2007/0091890 A1    Apr. 26, 2007

(51) Int. Cl.
*H04L 12/28* (2006.01)
*H04L 12/56* (2006.01)

(52) U.S. Cl. .................. 370/390; 370/395.31; 370/432

(58) Field of Classification Search .................. 370/312, 370/390, 392, 395.31, 395.32, 395.43, 395.5, 370/395.52, 395.53, 432, 433, 471, 475; 713/163

See application file for complete search history.

(56) References Cited

U.S. PATENT DOCUMENTS

| 5,959,989 | A | * | 9/1999 | Gleeson et al. ............. 370/390 |
| 6,701,361 | B1 | | 3/2004 | Meier .......................... 709/224 |
| 2002/0093973 | A1 | * | 7/2002 | Tzeng ......................... 370/419 |
| 2002/0131414 | A1 | * | 9/2002 | Hadzic ........................ 370/393 |
| 2003/0174706 | A1 | * | 9/2003 | Shankar et al. ............. 370/393 |

OTHER PUBLICATIONS

"Media Access Control (MAC) Bridges;" IEEE Std. 802.1D™-2004 (Revision of IEEE Std 802.1D-1998); IEEE Standard for Local and Metropolitan Area Networks; Jun. 9, 2004, pp. 64-73.
"Catalyst 4500 Series Switch Cisco IOS Software Configuration Guide," Cisco Systems, Inc., pp. 28-1 through 28-4.

* cited by examiner

*Primary Examiner*—Chirag G Shah
*Assistant Examiner*—Ashley L Shivers
(74) *Attorney, Agent, or Firm*—Campbell Stephenson LLP (57) ABSTRACT

A mechanism for a network device to constrain multicast flooding of out-of-profile multicast frames is provided by defining a multicast flood domain that includes a subset of ports that are members of the broadcast domain. Such a multicast flood domain can be user configured or dynamically configured to include device ports that are coupled to network elements that should receive such out-of-profile multicast transmissions and exclude network elements that should not receive such multicast transmissions. In one embodiment of the present invention, such capability is provided by incorporating into a network device a mechanism for performing a multicast flood domain lookup of an address table in the event that an out-of-profile multicast frame is received.

18 Claims, 6 Drawing Sheets

Figure 1

| Index (210) | MAC (L2) Address (220) | Broadcast Domain (235) | Port (230) |
|---|---|---|---|
| 1 | SMAC(120(1,1)) | VLAN(1) | 110(1) |
| 2 | SMAC(120(2,1)) | VLAN(1) | 110(2) |
| 3 | SMAC(120(2,2)) | VLAN(1) | 110(2) |
| 4 | SMAC(120(3,1)) | VLAN(1) | 110(3) |
| ... | ... | ... | ... |
| P | SMAC(120(N,1)) | VLAN(2) | 110(N) |

Figure 2

| Index (410) | MAC (L2) Address (420) | Port (430) | |
|---|---|---|---|
| 1 | SMAC(120(1,1)) | 110(1) | ⎫ 440 |
| 2 | SMAC(120(2,1)) | 110(2) | |
| ... | ... | ... | |
| P | SMAC(120(N,1)) | 110(N) | ⎫ 450 |
| P+1 | 01:00:5e:7f:00:01 | 110(1), 110(3) | |
| P+2 | 01:00:5e:xx:xx:xx | 110(1),...,110(N) | |
| ... | ... (465) | ... | |
|  | (460) | (470) | |

Figure 4A

| Index (410) | MAC (L2) Address (420) | Broadcast Domain (435) | Port (430) | |
|---|---|---|---|---|
| 1 | SMAC(120(1,1)) | VLAN(1) | 110(1) | |
| 2 | SMAC(120(2,1)) | VLAN(1) | 110(2) | |
| ... | ... | ... | ... | |
| P | SMAC(120(N,1)) | VLAN(2) | 110(N) | |
| P+1 | 01:00:5e:7f:00:01 | VLAN(1) | 110(1), 110(3) | |
| ... | ... | ... | ... | |
| P+N+1 | RA(IPv4) | VLAN(1) | 110(2), 110(3), 110(4) | ⎫ 480 |
| P+N+2 | RA(IPv4) | VLAN(2) | 110(5), 110(N) | |
| P+N+3 | RA(IPv6) | VLAN(1) | 110(1), 110(2), 110(4) | |
| P+N+4 | RA(DECnet) | VLAN(2) | 110(5) | |

CONSTRAINING FLOODING OF MULTICAST TRAFFIC IN LAYER2 NETWORKS

FIELD OF THE INVENTION

The field of this invention relates to information networks. Specifically, a method, system, and apparatus are presented to constrain out-of-profile multicast flooding of a broadcast domain by an OSI Level 2 network device through the use of a multicast flood domain that comprises a subset of the nodes of the broadcast domain.

BACKGROUND OF THE INVENTION

Today's network links carry vast amounts of information. High bandwidth applications supported by these network links include, for example, streaming video, streaming audio, and large aggregations of voice traffic. In the future, network bandwidth demands will increase. Certain applications, such as streaming audio and streaming video, can generate a large amount of network traffic due to sending such a transmission to multiple subscribers. In order to help decrease network traffic load due to such applications, multicast extensions to network protocols have been developed.

Multicast protocols enable multicast transmission (i.e., one-to-many connections) by replicating a multicast network frame close to the destination of that frame, obviating the need for multiple unicast connections for the same purpose, thereby saving network bandwidth and improving throughput. Upon receiving a multicast frame, a network node can examine a multicast group destination address (GDA) of the frame and determine whether subscribers to the multicast frame are coupled, directly or indirectly, to the network node. The network node can then replicate the multicast frame as needed and transmit the multicast frame to any connected subscribing nodes.

Figure 1:
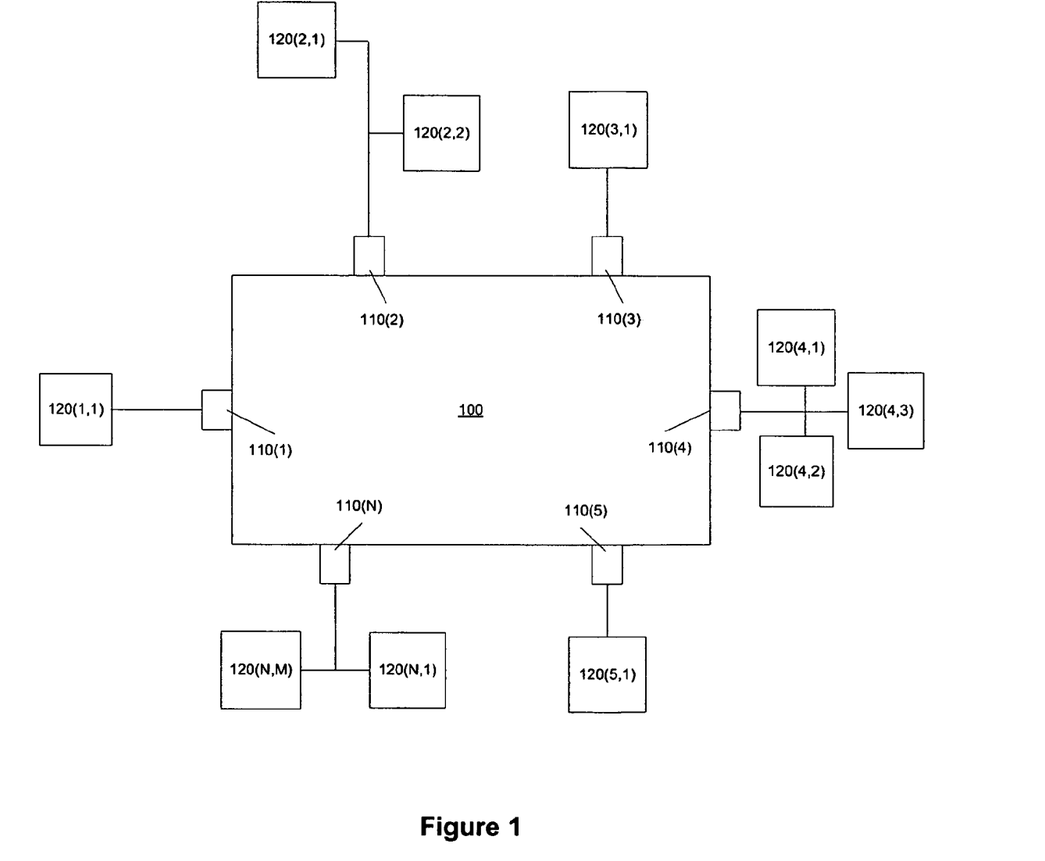
FIG. 1 is a simplified block diagram of a network switch that can be used with one embodiment of the present invention.

FIG. 1 is a simplified block diagram of a network switch 100. The switch provides ports 110(1)-(N), wherein a network frame arriving at any port can be directed to any other port connected to the switch as determined by an examination of the frame's destination address. Connected to each port are network nodes 120(1,1)-(N,M). In a typical network environment, each network node 120(1,1)-(N,M) has a unique media access control (MAC) address. Switch 100 can learn the MAC addresses of network nodes 120(1,1)-(N,M) as those nodes transmit frames to each other via the switch. Each frame transmitted by a network node contains a source MAC address that switch 100 can read and associate with the coupled port. Such node-port information is stored in an address table. Such a table has been called an L2 address table (referring to Level 2 of the Open System Interconnection (OSI) networking framework for implementing protocols, which is also called the data link layer) or an MAC address table.

Within the OSI network model, a network node, or applications on a network node, can have a different representation of its network address at each level of the model. As described, switch 100 operates at Level 2 (L2). These L2, or MAC addresses, of a network node are unique to each network interface on a network and are typically hardware encoded in the network interface. MAC addresses are 48 bits in length, containing a 24-bit vendor code followed by a 24-bit hardware address. A network node can also have an OSI Level 3 address, which can be an address such as Internet protocol (IP) addresses. IP addresses are software encoded and can be supplied by a network administrator or dynamically determined within the environment that the network node resides. In version 4 of the Internet protocol (IPv4), L3 addresses are 32 bits in length, while in Internet protocol version 6 (IPv6), L3 addresses are 128 bits in length. When transmitting over a network, an OSI Level 3 packet is encapsulated within an OSI Level 2 frame, therefore such frames contain both L2 and L3 source and destination addresses.

Figure 2:
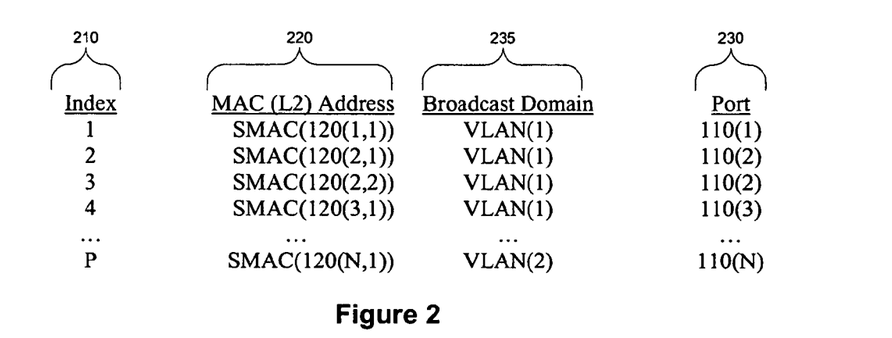
FIG. 2 illustrates an L2 address table showing node-port associations of a network switch, such as that illustrated in FIG. 1.

FIG. 2 illustrates an L2 address table showing node-port associations of switch 100. Each entry in the table has an associated index 210. The number of entries in the table can be equal to the number of nodes connected to switch 100 (e.g., P). Each entry in the table includes a MAC address 220 that corresponds to a source MAC address found in frames transmitted by each node (e.g., SMAC (120(1,1)) is the source MAC address for node 120(1,1) in FIG. 1). Each L2 address table entry also includes a port 230 corresponding to the node, wherein the node-port association is made by switch 100 when it receives a frame from the network node. Information linking a node address with a particular port is related to the hardware of the node (e.g., a network interface) and is typically static in an L2 address table, unless a node is physically moved from one port to another port on the switch. An additional field of data that can optionally be included in an L2 address table is a broadcast domain identifier 235. Such a broadcast domain identifier can be that of a virtual LAN (VLAN). VLAN associations of ports can be configured in software by a network administrator.

An L2 address table cannot automatically be populated with multicast destinations as is done with node-port designations. This is because a multicast GDA cannot be a source MAC address. Typically, a portion of an L3 multicast GDA is included in an L2 address table through the use of software protocols such as the Internet Group Management protocol (IGMP). When a network node wishes to subscribe to a multicast transmission, a special IGMP frame is transmitted as a multicast "join" request. An IGMP-enabled switch can have "snooping" software to allow the switch to read the IGMP frame and build a corresponding entry in the L2 address table. Such an entry can relate a form of the multicast GDA (an L3 address) with ports that are connected to subscribing nodes. An IGMP frame contains an L3 GDA along with other information pertinent to the operation requested in the IGMP frame. Such an L3 address requires manipulation to be included in an L2 address table.

Figure 3:
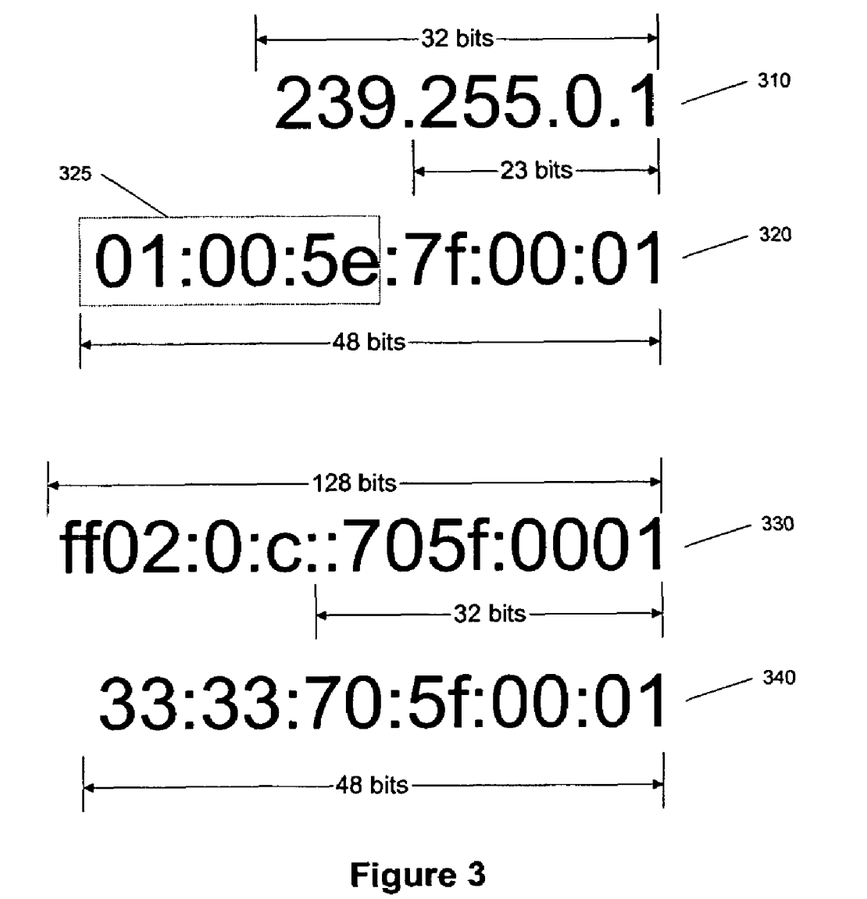
FIG. 3 illustrates a manipulation of IPv4 and IPv6 multicast group destination addresses into a form acceptable for inclusion into entries of an L2 address table, such as that illustrated in FIG. 2.

FIG. 3 illustrates a manipulation of IPv4 and IPv6 multicast group destination addresses into a form acceptable for inclusion into entries of an L2 address table. An IPv4 GDA is 32 bits in length an falls in the range of addresses 224.0.0.0-239.255.255.255. Such an IP address is illustrated at 301 in FIG. 3. As stated above, an L2 address is limited to 48 bits, which is split into two 24-bit segments. The first three octets (the first 24 bits) of an L2 MAC multicast address are set to 01:00:5e (325). To create an L2 MAC multicast address for the L2 address table corresponding to an L3 GDA, the last 23 bits of the L3 GDA are inserted into the last 23 bits of the MAC address 320. Five of the nine bits are significant, since the first four bits of any IPv4 multicast address are always 1110. Similarly, an IPv6 address is 128 bits in length, and an L3 IPv6 GDA (330) is converted to an L2 MAC address (340).

Figure 4A:
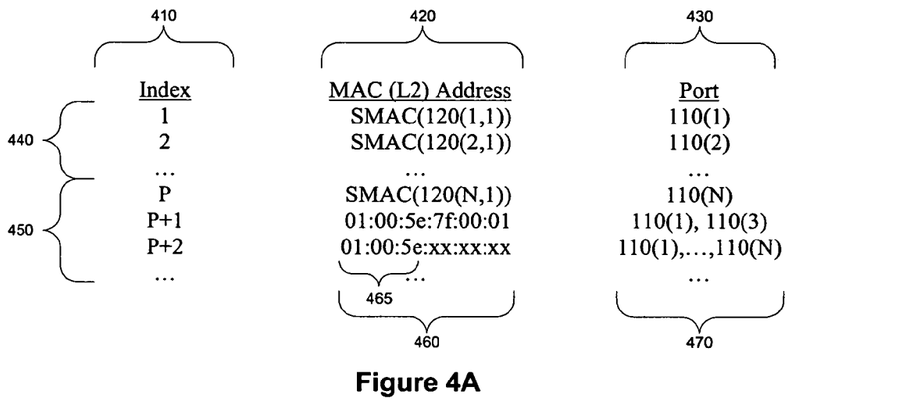
FIG. 4A illustrates an L2 address table including MAC multicast destination addresses.

FIG. 4A illustrates an L2 address table including MAC multicast destination addresses. As with FIG. 2, the table contains an initial set of P entries, each containing index 410, address 420 and port 430. The first set of unicast addresses 440 is received into the table as discussed above. A set of multicast destination addresses 450 is illustrated as additional entries (P+1) and (P+2). As illustrated, a generic MAC multicast destination address 460 includes the initial octets 01:00:

5e, followed by a subsequent set of three octets into which bits from the IPv4 GDA are inserted. Each multicast entry is associated with a group of one or more ports (470) coupled to subscribing network nodes.

Typically, when an L2 network device such as switch 100 receives a multicast frame, the L2 network device performs a lookup in the L2 address table to determine if there is a corresponding entry for the L2 multicast destination address of the multicast frame. If there is a corresponding entry within the L2 address table, then the L2 network device replicates the multicast frame, as needed, and transmits the replicated multicast frame to all the ports associated with the multicast destination address in the L2 address table entry. Should an L2 network device receive a multicast frame for which there is no corresponding entry in the L2 address table, also known as an out-of-profile multicast frame, then a typical response is to flood the broadcast domain upon which the multicast frame was received with replicated frames. That is, each port associated with the broadcast domain will receive a transmission of the out-of-profile multicast frame. Transmission of an out-of-profile multicast frame to all ports in a broadcast domain is called multicast flooding.

An out-of-profile multicast frame can be received for a variety of reasons. For example, the L2 network device may not have any multicast forwarding states in the L2 address table, or the L2 network device may not support protocols for multicast forwarding optimization such as IGMP snooping, PIM snooping or the L2 network device may have run out of space in the L2 address table so that new multicast destination addresses cannot be created in the table. Regardless of the reason for a multicast flooding, such flooding can be an undesirable condition.

Among the reasons that multicast flooding can be considered undesirable are that network resources such as bandwidth and processing are consumed by the replication and transmission of an out-of-profile multicast frame on all ports belonging to the broadcast domain. Further, processor resources in downstream L2 and L3 network devices can be consumed by having to examine and drop unnecessary frames. Prior art solutions to avoiding multicast flooding include dropping frames directed to an out-of-profile multicast destination address or rate limiting the transmission of such frames.

Dropping an out-of-profile multicast frame can be undesirable because not all out-of-profile multicast frames are necessarily unwanted. For example, as suggested above, the L2 network device could have run out of space in the L2 address table and therefore could not create a new entry for a subscriber node. Therefore, dropping the out-of-profile multicast frame can result in a subscriber node not receiving the frame. Similarly, if the L2 network device does not contain multicast states in the L2 address table or does not support protocols for adding multicast addresses in an optimized fashion, subscriber network nodes will not receive a desired transmission.

Rate limiting the flooding of out-of-profile multicast frames is a median solution between dropping all such packets and flooding all such packets. The L2 network device can set an outgoing packet rate for out-of-profile multicast flooding. Therefore some of the frames of an out-of-profile multicast transmission will get transmitted to all ports in the broadcast domain and some will be dropped. Again this can be an undesirable solution for those nodes that may want to receive that multicast transmission but have no means for getting that subscriber information into the L2 address table.

What is therefore desired, is a means to provide out-of-profile multicast frames only to network nodes for which it is desirable to send such traffic. In other words, it is desirable to constrain multicast flooding to a multicast flood domain that includes either a set of statically-selected nodes or dynamically determined nodes.

BRIEF DESCRIPTION OF THE DRAWINGS

The present invention may be better understood, and its numerous objects, features and advantages made apparent to those skilled in the art by referencing the accompanying drawings.

DETAILED DESCRIPTION

Flooding of out-of-profile multicast frames is a typical occurrence in L2 network devices. The present invention provides for the ability of an L2 network device to constrain multicast flooding by defining a multicast flood domain that includes a subset of ports that are members of the broadcast domain. Such a multicast flood domain can be user configured or dynamically configured to include L2 device ports that are coupled to network elements that should receive such out-of-profile multicast transmissions and exclude network elements that should not receive such multicast transmissions. In one embodiment of the present invention, such capability is provided by incorporating into an L2 network device a mechanism for performing a multicast flood domain lookup of an L2 address table in the event that an out-of-profile multicast frame is received.

FIG. 4A (as discussed above) illustrates an L2 address table of an L2 network device that includes MAC multicast destination addresses. As illustrated, each defined multicast destination address has an associated listing of ports to which a corresponding multicast frame should be transmitted. The illustrated multicast destination addresses are for IPv4, as indicated by the first three octets of the multicast destination addresses being 01:00:5e. L2 MAC multicast addresses for IPv6 can also be included in such an L2 address table, but will include a different value in the leading octets of the L2 MAC multicast address (e.g., 33:33 for the IPv6 address). L2 MAC multicast addresses for multicast frames transmitted using other network protocols (e.g., DECnet) can also be in an L2 address table in an L2 network device coupled to a network wherein multicast transmissions in such protocols can be expected.

Multicast flooding of a broadcast domain can occur when an out-of-profile multicast frame is received by an L2 network device. An out-of-profile multicast frame includes an L2 multicast destination address that is not found in the L2 network devices L2 address table. As discussed above, prior art devices will typically flood ports that are members of the broadcast domain upon which the multicast frame was received with transmitted replicas of the multicast frame.

In order to prevent flooding of a broadcast domain with out-of-profile multicast frames, a multicast flood domain can be defined in the L2 address table for each broadcast domain connected to the L2 network device and for each network protocol expected to be received by the L2 network device. Multicast flood domains can be included as entries in the L2 address table, using reserved addresses for the MAC address entry. Thus, when an L2 network device receives an out-of-profile multicast frame, the L2 network device can transmit the out-of-profile multicast frame to ports that are members of a multicast flood domain corresponding to the broadcast domain on which the out-of-profile multicast frame was received and corresponding to the out-of-profile multicast frame's network protocol.

Figure 4B:
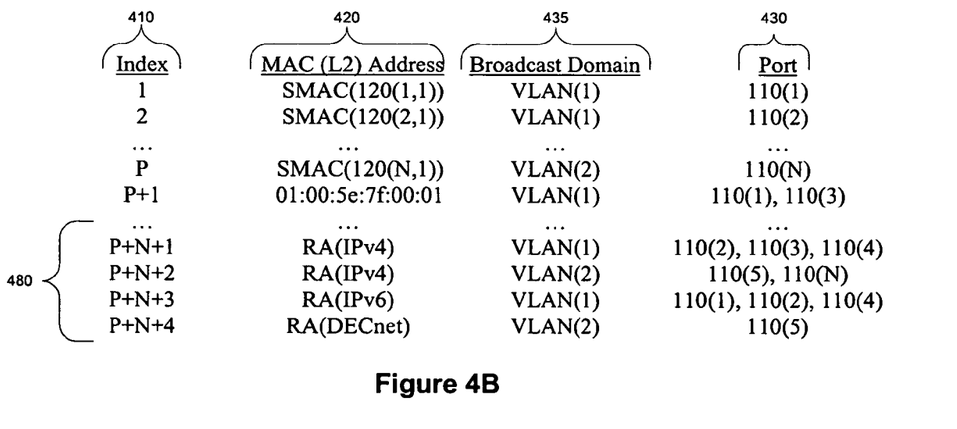
FIG. 4B illustrates an L2 address table including multicast flood domain addresses in accord with one embodiment of the present invention.

FIG. 4B illustrates an L2 address table that includes reserved addresses for multicast flood domains for various protocols on broadcast domains in accord with one embodiment of the present invention. FIG. 4B is a modification of the L2 address table discussed above for FIG. 4A that includes a definition of broadcast domain (435) for each entry. In addition, reserved address entries have been defined for multicast flood domains (480). The illustrated reserve addresses are defined for IPv4 (entries P+N+1 and P+N+2), IPv6 (entry P+N+3), and DECnet (entry P+N+4) multicast protocols. In addition, reserve addresses for IPv4 in two different broadcast domains are illustrated (entries P+N+1 and P+N+2). Ports are associated with each defined reserve address in the L2 address table in a fashion similar to that for defined multicast addresses.

In one embodiment of the present invention, a multicast flood domain can be defined statically by a network administrator. The network administrator can determine which ports are coupled to network elements that should receive out-of-profile multicast transmission for a particular multicast network protocol. The network administrator can then include those ports in the L2 address table entry for a reserved address corresponding to the particular multicast network protocol (e.g., through the use of an administrative interface either provided by the L2 network device itself or a central administrative node on the network). The network administrator can perform such a defining task for each expected multicast network protocol and for each broadcast domain served by the L2 network device.

In another embodiment of the present invention, ports for a multicast flood domain can be selected dynamically by the L2 network device. Dynamic selection can be performed so that a port coupled to any multicast capable network router is made a member of the multicast flood domain. Alternatively, a port can be dynamically selected as a member of the multicast flood domain if the port is coupled to a PIM sparse mode Designated Router or a bi-directional PIM Designated Forwarder router. This manner of dynamic selection limits the ports that are members of a multicast flood domain to those ports that are coupled to network routers that are either capable of responding to a multicast frame or are designated by an appropriate PIM protocol for handling multicast packets.

In one embodiment of the present invention, dynamic selection of ports can be performed through the use of a "snooping" protocol in order to determine those ports that are coupled to routers that meet the selected criteria for handling multicast packets. For example, an L2 network device using a PIM snooping protocol can capture PIM messages received by a port on the L2 network device. By examining those PIM control messages the L2 network device can determine whether to include that port within a multicast flood domain.

Figure 5:
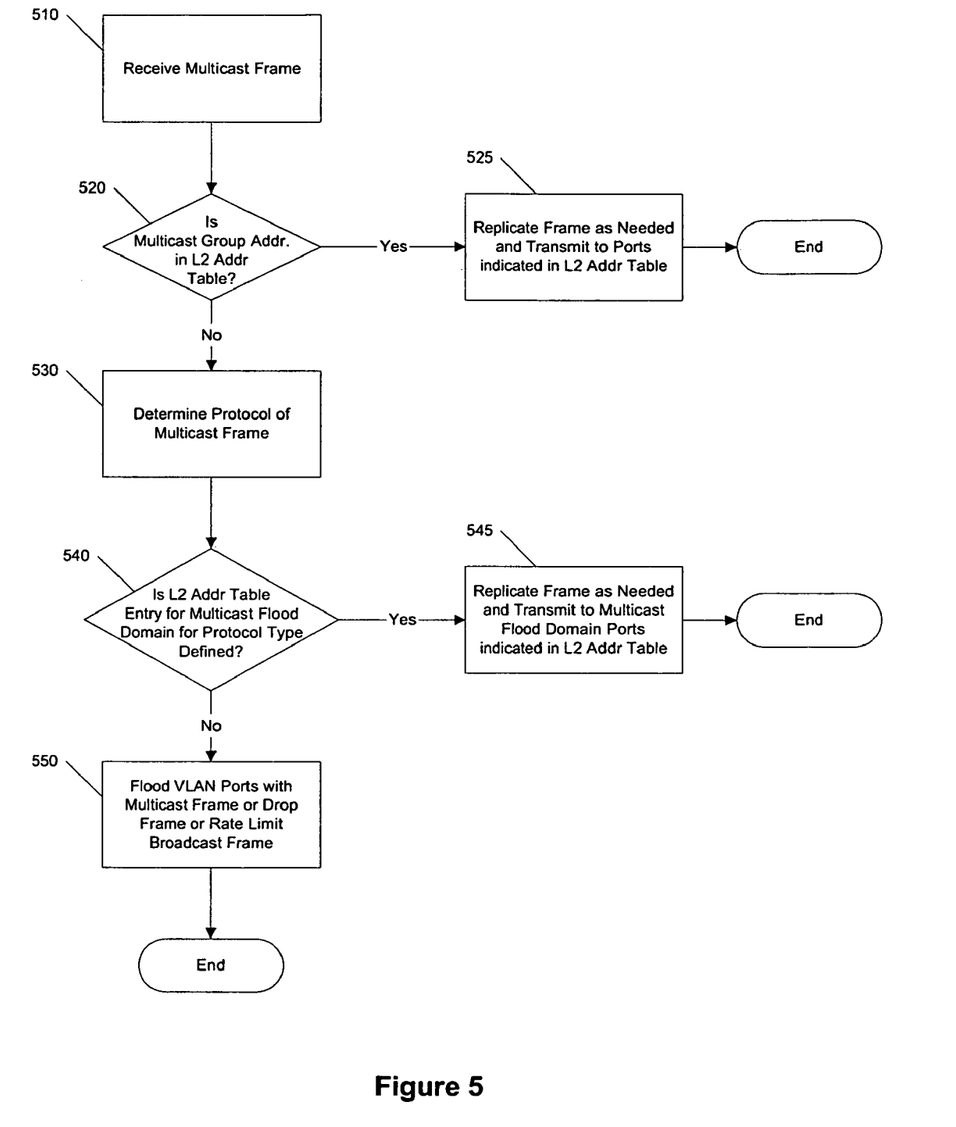
FIG. 5 is a simplified flow diagram illustrating a process performed by an L2 network device in processing a multicast frame in accord with one embodiment of the present invention.

FIG. 5 is a simplified flow diagram illustrating a process performed by an L2 network device in processing a multicast frame in accord with one embodiment of the present invention. A multicast frame is first received by the L2 network device (510). The L2 network device then performs an L2 address table lookup to determine whether the multicast destination in the multicast frame has been defined (520). If the frame has a corresponding entry in the L2 address table, then the L2 network device can replicate the frame as needed and transmit the multicast frame to ports indicated in the L2 address table (525).

If the multicast destination address of the multicast frame is not found in the L2 table (i.e., the multicast frame is out-of-profile), then the switch can determine the protocol of the out-of-profile multicast frame (530) (e.g., through an examination of the initial sets of octets of the L2 multicast address of the out-of-profile multicast frame). An L2 address table lookup can then be performed to determine whether there is a multicast flood domain entry in the L2 address table for the determined protocol type of the multicast frame (540) (e.g., in one embodiment of the present invention, this lookup is performed for the reserved address associated with the protocol type). If such a multicast flood domain for that protocol type has been defined, then the L2 network device can replicate the frame as needed and transmit the multicast frame to the ports associated with the multicast flood domain in the L2 address table (545). If there is no entry for a multicast flood domain for the particular protocol type of the multicast frame, then the L2 network device can flood ports belonging to the broadcast domain, drop the multicast frame, or perform a rate-limited transmission of the multicast frame (550). Such a fallback action can be defined when a network administrator configures the L2 network device.

For an L2 network device that is coupled to multiple broadcast domains (e.g., a VLAN-capable switch) a similar process as illustrated in FIG. 5 can be performed, with the L2 network device making a determination of whether a multicast flood domain for a particular protocol has been defined for the broadcast domain on which the out-of-profile multicast frame was received. This determination can be performed by performing an L2 address table lookup on both the multicast destination address and the broadcast domain.

Resolving an out-of-profile multicast destination address can therefore be described as a two-fold lookup of the L2 address table. A first lookup is performed to determine whether the multicast destination address has been defined in the L2 address table (that is, whether the multicast destination address is associated with any ports in the L2 network device). If the multicast destination address is out-of-profile, then a second lookup is performed to determine whether a reserved address associated with the protocol of the multicast frame, and optionally the broadcast domain, has been defined in the L2 address table. If both lookups fail, then the L2 network device can transmit or drop the out-of-profile frame according to a defined fallback action.

An Example Computing and Network Environment

Figure 6:
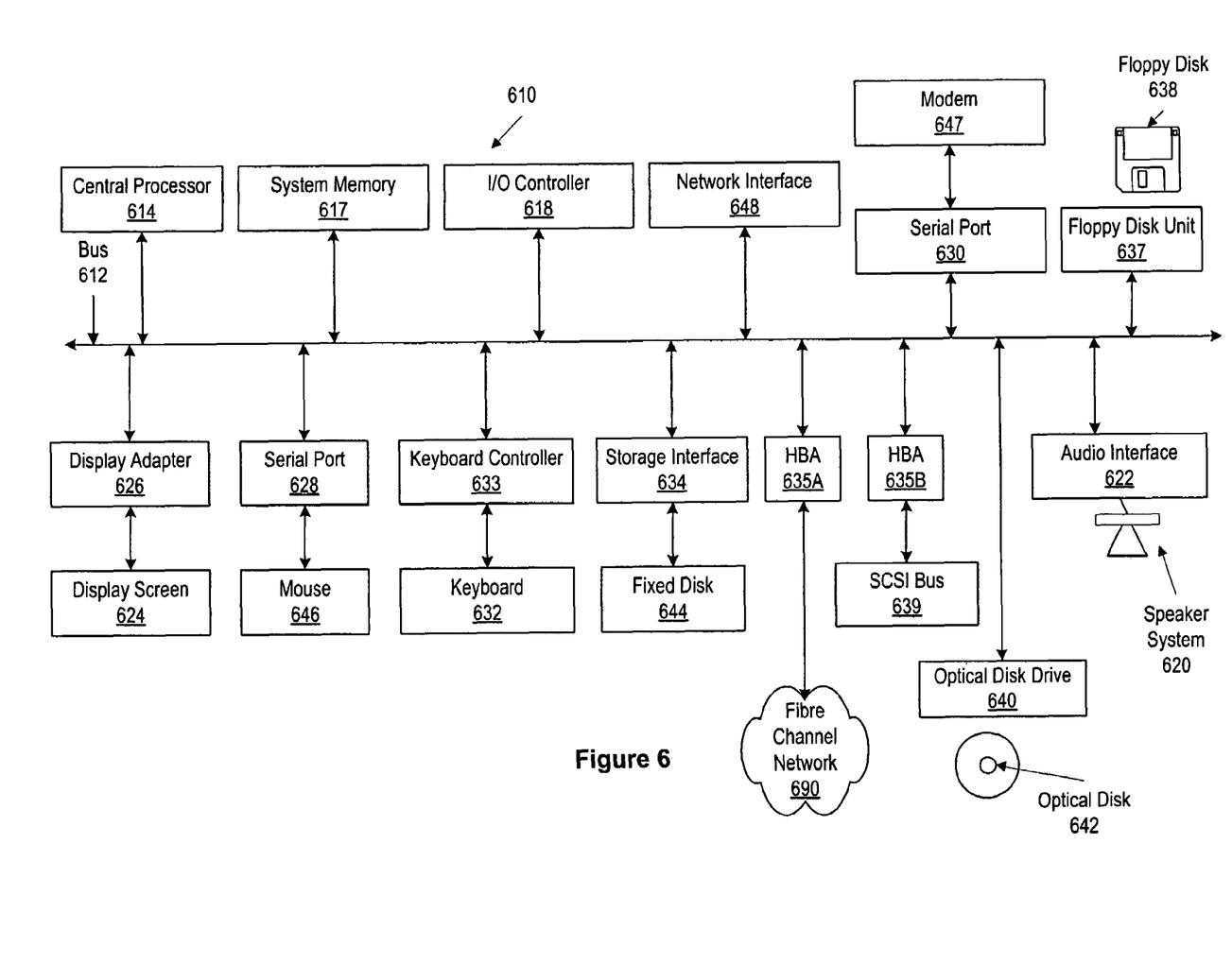
FIG. 6 is a simplified block diagram of a computer system suitable for implementing one embodiment of the present invention.

FIG. 6 depicts a block diagram of a computer system 610 suitable for implementing the present invention. Computer system 610 includes a bus 612 which interconnects major subsystems of computer system 610, such as a central processor 614, a system memory 617 (typically RAM, but which may also include ROM, flash RAM, or the like), an input/output controller 618, an external audio device, such as a speaker system 620 via an audio output interface 622, an external device, such as a display screen 624 via display adapter 625, serial ports 628 and 630, a keyboard 632 (interfaced with a keyboard controller 633), a storage interface 634, a floppy disk drive 637 operative to receive a floppy disk 638, a host bus adapter (HBA) interface card 635A operative to connect with a fibre channel network 690, a host bus adapter (HBA) interface card 635B operative to connect to a SCSI bus 639, and an optical disk drive 640 operative to receive an optical disk 642. Also included are a mouse 645 (or other point-and-click device, coupled to bus 612 via serial port 628), a modem 647 (coupled to bus 612 via serial port 630), and a network interface 648 (coupled directly to bus 612).

Bus 612 allows data communication between central processor 614 and system memory 617, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components. Applications resident with computer system 610 are generally stored on and accessed via a computer readable medium, such as a hard disk drive (e.g., fixed disk 644), an optical drive (e.g., optical drive 640), a floppy disk unit 637, or other storage medium. Additionally, applications can be in the form of electronic signals modulated in accordance with the application and data communication technology when accessed via network modem 647 or interface 648.

Storage interface 634, as with the other storage interfaces of computer system 610, can connect to a standard computer readable medium for storage and/or retrieval of information, such as a fixed disk drive 644. Fixed disk drive 644 may be a part of computer system 610 or may be separate and accessed through other interface systems. Modem 647 may provide a direct connection to a remote server via a telephone link or to the Internet via an internet service provider (ISP). Network interface 648 may provide a direct connection to a remote server via a direct network link to the Internet via a POP (point of presence). Network interface 648 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., bar code readers, document scanners, digital cameras and so on). Conversely, all of the devices shown in FIG. 6 need not be present to practice the present invention. The devices and subsystems can be interconnected in different ways from that shown in FIG. 6. The operation of a computer system such as that shown in FIG. 6 is readily known in the art and is not discussed in detail in this application. Code to implement the present invention can be stored in computer-readable storage media such as one or more of system memory 617, fixed disk 644, optical disk 642, or floppy disk 638. Additionally, computer system 610 can be any kind of computing device, and so includes personal data assistants (PDAs), network appliance, X-window terminal or other such computing devices. The operating system provided on computer system 610 may be MS-DOS®, MS-WINDOWS®, OS/2®, UNIX®, Linux®, or another known operating system. Computer system 610 also supports a number of Internet access tools, including, for example, an HTTP-compliant web browser having a JavaScript interpreter, such as Netscape Navigator®, Microsoft Internet Explorer®, and the like.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present invention may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

Figure 7:
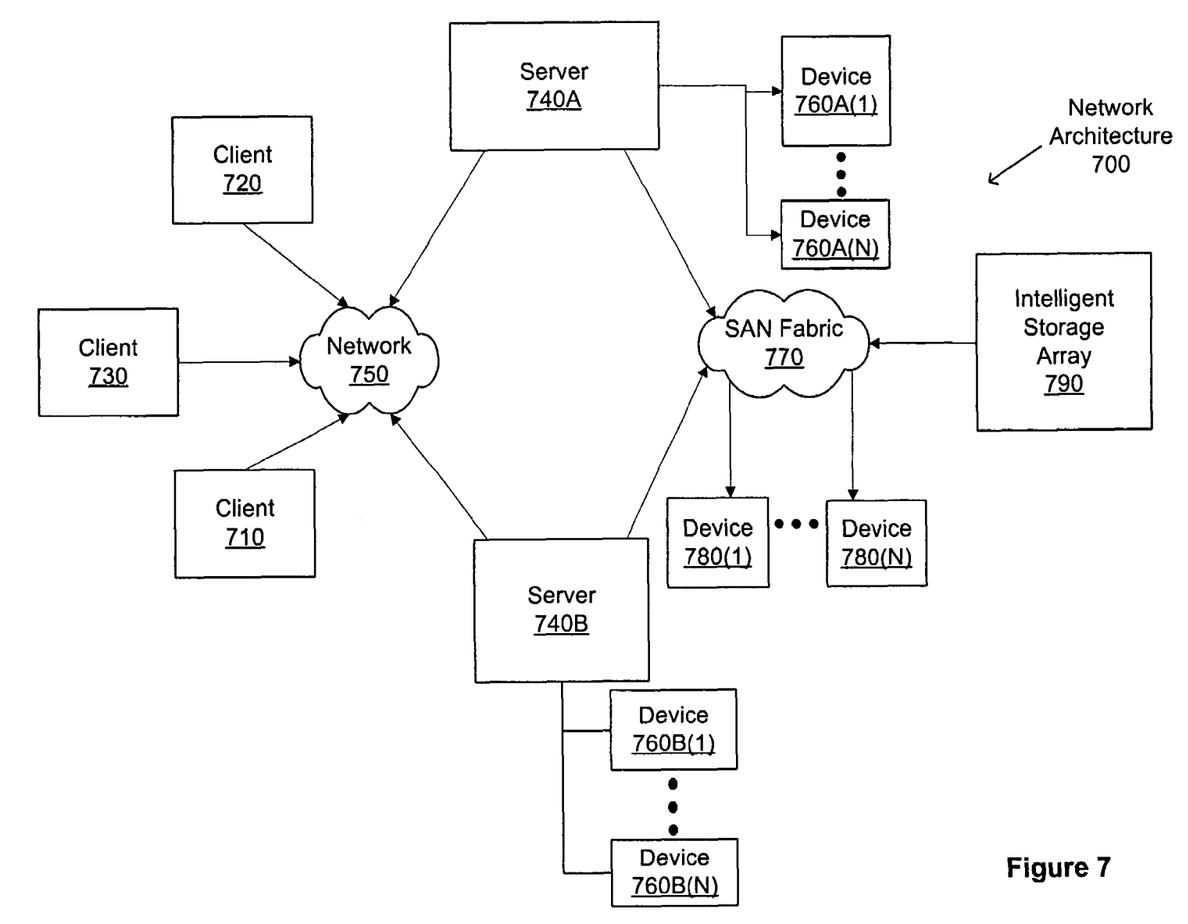
FIG. 7 is a simplified block diagram of a network architecture suitable for implementing one embodiment of the present invention.

FIG. 7 is a block diagram depicting a network architecture 700 in which client systems 710, 720 and 730, as well as storage servers 740A and 740B (any of which can be implemented using computer system 610), are coupled to a network 750. Storage server 740A is further depicted as having storage devices 760A(1)-(N) directly attached, and storage server 740B is depicted with storage devices 760B(1)-(N) directly attached. Storage servers 740A and 740B are also connected to a SAN fabric 770, although connection to a storage area network is not required for operation of the invention. SAN fabric 770 supports access to storage devices 780(1)-(N) by storage servers 740A and 740B, and so by client systems 710, 720 and 730 via network 750. Intelligent storage array 790 is also shown as an example of a specific storage device accessible via SAN fabric 770.

With reference to computer system 610, modem 647, network interface 648 or some other method can be used to provide connectivity from each of client computer systems 710, 720 and 730 to network 750. Client systems 710, 720 and 730 are able to access information on storage server 740A or 740B using, for example, a web browser or other client software (not shown). Such a client allows client systems 710, 720 and 730 to access data hosted by storage server 740A or 740B or one of storage devices 760A(1)-(N), 760B(1)-(N), 780(1)-(N) or intelligent storage array 790. FIG. 7 depicts the use of a network such as the Internet for exchanging data, but the present invention is not limited to the Internet or any particular network-based environment.

Other Embodiments

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

The foregoing describes embodiments including components contained within other components (e.g., the various elements shown as components of computer system 610). Such architectures are merely examples, and, in fact, many other architectures can be implemented which achieve the same functionality. In an abstract but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected," or "operably coupled," to each other to achieve the desired functionality.

The foregoing detailed description has set forth various embodiments of the present invention via the use of block diagrams, flowcharts, and examples. It will be understood by those within the art that each block diagram component, flowchart step, operation and/or component illustrated by the use of examples can be implemented, individually and/or collectively, by a wide range of hardware, software, firmware, or any combination thereof.

The present invention has been described in the context of fully functional computer systems; however, those skilled in the art will appreciate that the present invention is capable of being distributed as a program product in a variety of forms, and that the present invention applies equally regardless of the particular type of signal bearing media used to actually carry out the distribution. Examples of signal bearing media include recordable media such as floppy disks and CD-ROM, transmission type media such as digital and analog communications links, as well as media storage and distribution systems developed in the future.

The above-discussed embodiments can be implemented by software modules that perform certain tasks. The software modules discussed herein may include script, batch, or other executable files. The software modules may be stored on a machine-readable or computer-readable storage medium such as a disk drive. Storage devices used for storing software modules in accordance with an embodiment of the invention may be magnetic floppy disks, hard disks, or optical discs such as CD-ROMs or CD-Rs, for example. A storage device used for storing firmware or hardware modules in accordance with an embodiment of the invention can also include a semiconductor-based memory, which may be permanently, removably or remotely coupled to a microprocessor/memory system. Thus, the modules can be stored within a computer system memory to configure the computer system to perform the functions of the module. Other new and various types of computer-readable storage media may be used to store the modules discussed herein.

The above description is intended to be illustrative of the invention and should not be taken to be limiting. Other embodiments within the scope of the present invention are possible. Those skilled in the art will readily implement the steps necessary to provide the structures and the methods disclosed herein, and will understand that the process parameters and sequence of steps are given by way of example only and can be varied to achieve the desired structure as well as modifications that are within the scope of the invention. Variations and modifications of the embodiments disclosed herein can be made based on the description set forth herein, without departing from the scope of the invention.

Consequently, the invention is intended to be limited only by the scope of the appended claims, giving full cognizance to equivalents in all respects.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A method comprising:
   receiving, by a L2 network device, a multicast frame comprising a multicast group destination address, wherein the multicast frame is associated with a broadcast domain;
   comparing the multicast group destination address with one or more table entries in an address table; and
   if there is no corresponding table entry in the address table to the multicast group destination address, then
      determining a network protocol type of the multicast frame,
      comparing the network protocol type of the multicast frame with the one or more table entries in the address table to identify a multicast flood domain associated with the network protocol type of the multicast frame, and
      transmitting the multicast frame or a replication thereof via the multicast flood domain, wherein
   the address table comprises an entry for the multicast flood domain that identifies a first set of ports which is less than all ports associated with the broadcast domain on the network device, and
   the address table comprises a plurality of entries each corresponding to a multicast flood domain and having an association with a network protocol type of a plurality of network protocol types.

2. The method of claim 1 wherein said transmitting comprises:
   associating the multicast frame with the multicast flood domain, wherein
      the multicast flood domain is associated with the first set of ports.

3. The method of claim 2, wherein
   said comparing the multicast group destination address comprises comparing the multicast group destination address with the one or more table entries associated with the broadcast domain in the address table.

4. The method of claim 3 wherein the first set of ports comprises:
   a subset of all ports associated with the broadcast domain.

5. The method of claim 2 further comprising:
   configuring the multicast flood domain, wherein
      said configuring comprises associating a first port with the first set of ports.

6. The method of claim 5 wherein said associating the first port with the first set of ports comprises:
   selecting the first port; and
   entering an identifier for the first port in a multicast flood domain entry in the address table.

7. The method of claim 6 wherein said selecting the first port comprises:
   determining whether the first port is coupled to a multicast capable router; and
   selecting the first port, if said determining is positive.

8. The method of claim 6 wherein said selecting the first port comprises:

determining whether the first port is coupled to one of a PIM sparse mode Designated Router or a bidirectional PIM Designated Forwarder; and selecting the first port, if said determining is positive.

9. The method of claim 6 wherein said selecting the first port comprises:

determining whether the first port is coupled to a multicast router that is required by a PIM protocol; and selecting the first port, if said determining is positive.

10. A network apparatus comprising:

a first port configured to receive a multicast frame comprising a multicast group destination address, wherein the multicast frame is associated with a broadcast domain;

a first processor configured to compare the multicast group destination address with one or more table entries in an address table, determine a network protocol type of the multicast frame, and compare the network protocol type of the multicast frame with the one or more table entries in the address table to identify a multicast flood domain associated with the network protocol type of the multicast frame; and a first set of ports, wherein the first set of ports is configured to transmit the multicast frame or a replication thereof via the multicast flood domain if there is no entry in the address table corresponding to the multicast group destination address, wherein the address table comprises an entry for the multicast flood domain that identifies the first set of ports which is less than all ports associated with the broadcast domain on the network device, and the address table comprises a plurality of entries each corresponding to a multicast flood domain and having an association with a network protocol type of a plurality of network protocol types.

11. The network apparatus of claim 10 further comprising:

a second processor configured to associate the multicast frame with the multicast flood domain, wherein the multicast flood domain is associated with the first set of ports.

12. The network apparatus of claim 11, wherein the first processor is further configured to compare the multicast group destination address with the one or more table entries associated with the broadcast domain in the address table.

13. The network apparatus of claim 11 wherein the second processor is further configured to:

build the multicast flood domain, wherein building the multicast flood domain comprises associating a second port with the first set of ports.

14. The network apparatus of claim 13 wherein said associating the second port with the first set of ports comprises:

selecting the second port; and entering an identifier for the second port in a multicast flood domain entry in the address table.

15. The network apparatus of claim 14 wherein said selecting the second port comprises:

determining whether the second port is coupled to a multicast capable router; and selecting the second port, if said determining is positive.

16. The network apparatus of claim 14 wherein said selecting the second port comprises:

determining whether the second port is coupled to a multicast router that is required by a PIM protocol; and selecting the second port, if said determining is positive.

17. A network apparatus comprising:

a first port configured to receive a multicast frame comprising a multicast group destination address, wherein the multicast frame is associated with a broadcast domain;

means for comparing the multicast group destination address with one or more table entries in an address table; and means for determining a network protocol type of the multicast frame;

secondary means for comparing the network protocol type of the multicast frame with the one or more table entries in the address table to identify a multicast flood domain associated with the network protocol type of the multicast frame;

means for transmitting the multicast frame or a replication thereof via the multicast flood domain, if there is no corresponding table entry in the address table to the multicast group destination address, wherein the address table comprises an entry for the multicast flood domain that identifies a first set of ports which is less than all ports associated with the broadcast domain on the network device, and the address table comprises a plurality of entries each corresponding to a multicast flood domain and having an association with a network protocol type of a plurality of network protocol types.

18. The network apparatus of claim 17 wherein said means for transmitting comprises:

means for associating the multicast frame with the multicast flood domain, wherein the multicast flood domain is associated with the first set of ports.

* * * * *

UNITED STATES PATENT AND TRADEMARK OFFICE
CERTIFICATE OF CORRECTION

| | | |
|---|---|---|
| PATENT NO. | : 7,599,367 B2 | Page 1 of 1 |
| APPLICATION NO. | : 11/257696 | |
| DATED | : October 6, 2009 | |
| INVENTOR(S) | : Radhakrishnan et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 746 days.

Signed and Sealed this

Twenty-eighth Day of September, 2010

David J. Kappos
*Director of the United States Patent and Trademark Office*